United States Patent Office.

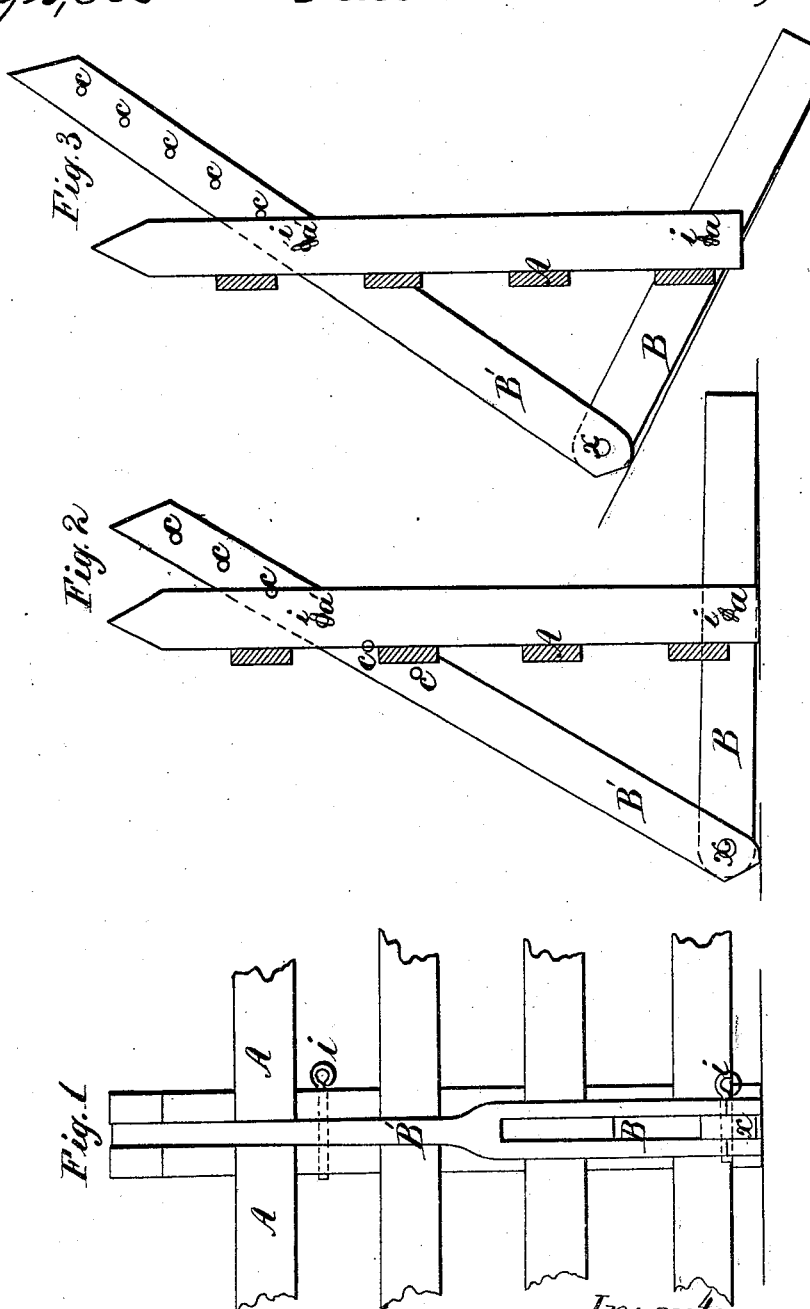

JOHN RIORDAN, OF SIX MILE, INDIANA.

Letters Patent No. 92,886, dated July 20, 1869.

IMPROVEMENT IN FENCE.

The Schedule referred to in these Letters Patent and making part of the same.

*To all whom it may concern:*

Be it known that I, JOHN RIORDAN, of Six Mile, in the county of Jennings, and State of Indiana, have invented a new and and useful Improvement in "Portable Fences; and do hereby declare that the following is a full, clear, and exact description of the same, reference being had to the accompanying drawings, which form part of this specification.

This invention consists in a novel construction of the connecting-brace of a portable fence, whereby a convenient lateral adjustment of the fence to suit hillsides or slanting localities may be effected.

Referring to the accompanying drawings—

Figure 1 represents a side view of the converging ends of two panels of a portable fence provided with my adjustable coupling-brace.

Figure 2 represents an end view of the same located upon level ground.

Figure 3 represents an end view of the same located upon slanting ground.

Similar letters of reference indicate corresponding parts in the several figures.

A A are panels of fence, constructed substantially as the panels of other portable fences, the posts thereof having bored in them the usual holes $a\ a'$, near their bottom and top, and in a direction lengthwise of the fence.

B B' is an angular connecting-brace, consisting of a horizontal or base-piece, B, and a slanting brace-piece, B', pivoted together at $x$, the base-piece B having bored through its central portion a hole corresponding with the holes $a$, near the bottom of the posts, and the slanting brace-piece B' having bored in its central and upper portion a line of holes, $c$, corresponding with the holes $a'$ near the top of the said posts.

The panels A A being adjusted as shown in the drawings, the angular connecting-brace B B' is placed between them, its horizontal base-piece lying flat on the ground, so as to bring its central hole opposite the holes $a$ of the posts, and the upper portion of the slanting brace-piece B' so adjusted, by means of the pivot $x$, as to intersect the posts at a pivot opposite the holes $a'$, bringing one of its holes $c$ opposite the upper holes $a'$. The parts are retained in said position by means of pins $i\ i$, passing through the said holes, top and bottom, as shown in the drawings.

What I claim as my invention, and desire to have secured by Letters Patent, is—

The forked brace B', pivoted, as at $x$, to the ground-sill B, and provided with adjusting-holes $c$, and pins $i\ i$, for supporting the end posts of two adjacent panels, A, substantially as shown and described.

JOHN RIORDAN.

Witnesses:
ANDREW KLEIN,
JOHN SCHMITT.